US012601853B2

(12) United States Patent
Jiang

(10) Patent No.: US 12,601,853 B2
(45) Date of Patent: Apr. 14, 2026

(54) MULTI-FUNCTIONAL MEASURING INSTRUMENT

(71) Applicant: JINHUA MAKA TECHNOLOGY CO., LTD, Jinhua (CN)

(72) Inventor: Hongzhou Jiang, Jinhua (CN)

(73) Assignee: JINHUA MAKA TECHNOLOGY CO., LTD, Jinhua (CN)

( * ) Notice: Subject to any disclaimer, the term of this patent is extended or adjusted under 35 U.S.C. 154(b) by 337 days.

(21) Appl. No.: 18/213,890

(22) Filed: Jun. 26, 2023

(65) Prior Publication Data

US 2024/0003722 A1 Jan. 4, 2024

(30) Foreign Application Priority Data

Jun. 27, 2022 (CN) .......................... 202221619612.5

(51) Int. Cl.
G01D 21/02 (2006.01)
G01S 17/08 (2006.01)
G01V 3/10 (2006.01)

(52) U.S. Cl.
CPC ............... G01V 3/10 (2013.01); G01D 21/02 (2013.01); G01S 17/08 (2013.01)

(58) Field of Classification Search
CPC .......... G01V 3/10; G01D 21/02; G01S 17/08; G01S 17/86
USPC ......... 73/865.8, 29.01, 29.02, 335.01–335.5, 73/29.04, 29.5; 33/263, 266, 276, 277, 33/281, 290; 356/3–22; 374/4–7, 100, 374/121–133; 348/92–95, 125, 158
See application file for complete search history.

(56) References Cited

U.S. PATENT DOCUMENTS

| | | | | |
|---|---|---|---|---|
| 2008/0265162 A1* | 10/2008 | Hamrelius | ................ | G01J 5/10 |
| | | | | 374/E1.001 |
| 2019/0049962 A1* | 2/2019 | Ouellette | ............. | G05D 1/0094 |

FOREIGN PATENT DOCUMENTS

| | | | | | | |
|---|---|---|---|---|---|---|
| CN | 114431174 | A | * | 5/2022 | ............. | G06K 17/00 |
| CN | 217236865 | U | * | 8/2022 | | |
| CN | 115597663 | A | * | 1/2023 | ............. | G01D 21/02 |
| CN | 115614594 | A | * | 1/2023 | ............. | F16L 55/32 |
| CN | 115484439 | B | * | 5/2023 | ............. | H04N 7/181 |
| KR | 20230089296 | A | * | 6/2023 | ............. | G08B 5/22 |
| WO | WO-2020079394 | A1 | * | 4/2020 | ............. | G01S 17/89 |

* cited by examiner

*Primary Examiner* — Robert R Raevis
(74) *Attorney, Agent, or Firm* — Birchwood IP

(57) ABSTRACT

A multi-functional measuring instrument includes: a housing, and a control circuit board and a wall detection circuit mounted inside the housing. Specifically, a hidden slot is arranged at a bottom end portion of the housing, a humidity measuring device is mounted inside the hidden slot in a sliding mode, and a thermal imaging device is mounted on one side of the housing. According to the present disclosure, the multi-functional measuring instrument is an instrument integrating various functions of wall detection, thermal imaging, distance measurement, laser projection, humidity measurement and the like. The instrument has a compact structure, is easy to carry on, and is applicable to various aspects of building detection, auto repair detection, floor-heating detection, electrical detection and the like.

9 Claims, 4 Drawing Sheets

MULTI-FUNCTIONAL MEASURING INSTRUMENT

TECHNICAL FIELD

The present disclosure relates to the technical field of measuring instruments, and in particular, relates to a multi-functional measuring instrument.

BACKGROUND

A measuring instrument is commonly used for measurements in engineering applications and practical life, which is widely applied in various industries of construction, auto repair, electrical engineering, and the like.

Currently, the function of the measuring instrument is relatively simple and limited, and thus several measuring instruments are needed in construction or maintenance processes. Construction personnel frequently change the measuring instruments to measure different objects, resulting in tedious and inconvenient operations, and deviation of measurement data is prone to occur. In addition, a measuring instrument having more functions is generally larger in size and inconvenient to carry on. Accordingly, a measuring instrument with diversified functions and a compact structure is urgently needed to solve the above problems.

SUMMARY

Embodiments of the present disclosure are intended to provide a multi-functional measuring instrument integrating diversified functions, having a compact structure, and facilitating convenient operations for the construction personnel.

According to one aspect of the embodiments of the present disclosure, a multi-functional measuring instrument is provided. The multi-functional measuring instrument includes: a housing, and a control circuit board and a wall detection circuit mounted inside the housing. A hidden slot is arranged at a bottom end portion of the housing, a humidity measuring device is slidably mounted inside the hidden slot, and a thermal imaging device is mounted on one side of the housing. The thermal imaging device is provided with a thermal imaging camera and a visible light camera, and the wall detection circuit, the humidity measuring device and the thermal imaging device are electrically connected to the control circuit board separately.

In some embodiments, the housing includes an upper housing, a middle frame, and a lower housing. The upper housing and the middle frame are integrally formed, the middle frame is connected to the lower housing via a connection support, and the control circuit board is arranged between the middle frame and the lower housing.

In some embodiments, a laser ranging device and a laser projection device are mounted at an inner top of the middle frame. The laser ranging device and the laser projection device are electrically connected to the control circuit board separately. The laser projection device adopts a cross-line laser head. A cross-shaped marking channel is correspondingly arranged on the housing, and the laser projection device is secured inside the middle frame via a securing base. A transmit channel and a receive channel that allow passage of light from and to a light source of the laser ranging device are arranged on the housing.

In some embodiments, the humidity measuring device includes: a press switch, two telescopic copper needles, a slide block, and a spring. The press switch takes the middle frame as a fulcrum to form a lever-supporting structure, an upper portion of the lever-supporting structure runs through the upper housing to form a press portion, a lower portion of the lever-supporting structure runs through the middle frame, a spring groove is arranged in the middle frame below the press portion, a lower end of the spring is arranged inside the spring groove, and an upper end of the spring is in contact with the press portion. A clamp block is arranged at a lower portion of the press switch, clamping slots cooperating with the clamp block are arranged on upper and lower sides of the slide block, and end portions of the two telescopic copper needles are secured to the slide block.

In some embodiments, a display screen mount is arranged at an upper portion of the middle frame. A display screen is mounted in the display screen mount, an outer screen is mounted on an outer side of the display screen, and the display screen is electrically connected to the control circuit board.

In some embodiments, a control button is arranged on the control circuit board, and a key portion cooperating with the control button is mounted on the middle frame.

In some embodiments, an illumination device is further mounted on a same side of the laser ranging device. The illumination device is eclectically connected to the control circuit board, a switch for turning on or off the illumination device is arranged on a side of the housing, and an illumination channel is corresponding arranged on the housing.

In some embodiments, an electroprobe is further mounted on a same side of the humidity measuring device. The electroprobe is electrically connected to the control circuit board, the electroprobe is hidden inside the housing via a toggle switch, and the electroprobe is further electrically connected to an alarm light.

In some embodiments, a nut is secured to the lower housing. The nut is embedded inside the lower housing, and the lower housing is connected to the outside via the nut and may be mounted on a tripod for use.

The technical solutions according to the present disclosure achieve the following beneficial effects over the related art, the present disclosure has the following beneficial effects:

The multi-functional measuring instrument according to the present disclosure is an instrument integrating various functions such as wall detection, thermal imaging, distance measurement, laser projection, and humidity measurement. The instrument is small in size and convenient to carry on, has a compact structure, and is applicable to various aspects of building detection, auto repair detection, floor-heating detection, electrical detection, and the like.

The humidity measuring device and electroprobe according to the present disclosure are designed as hidden structures, such that a volume of the instrument is further reduced, and use of the instrument is very convenient.

Figure 1:
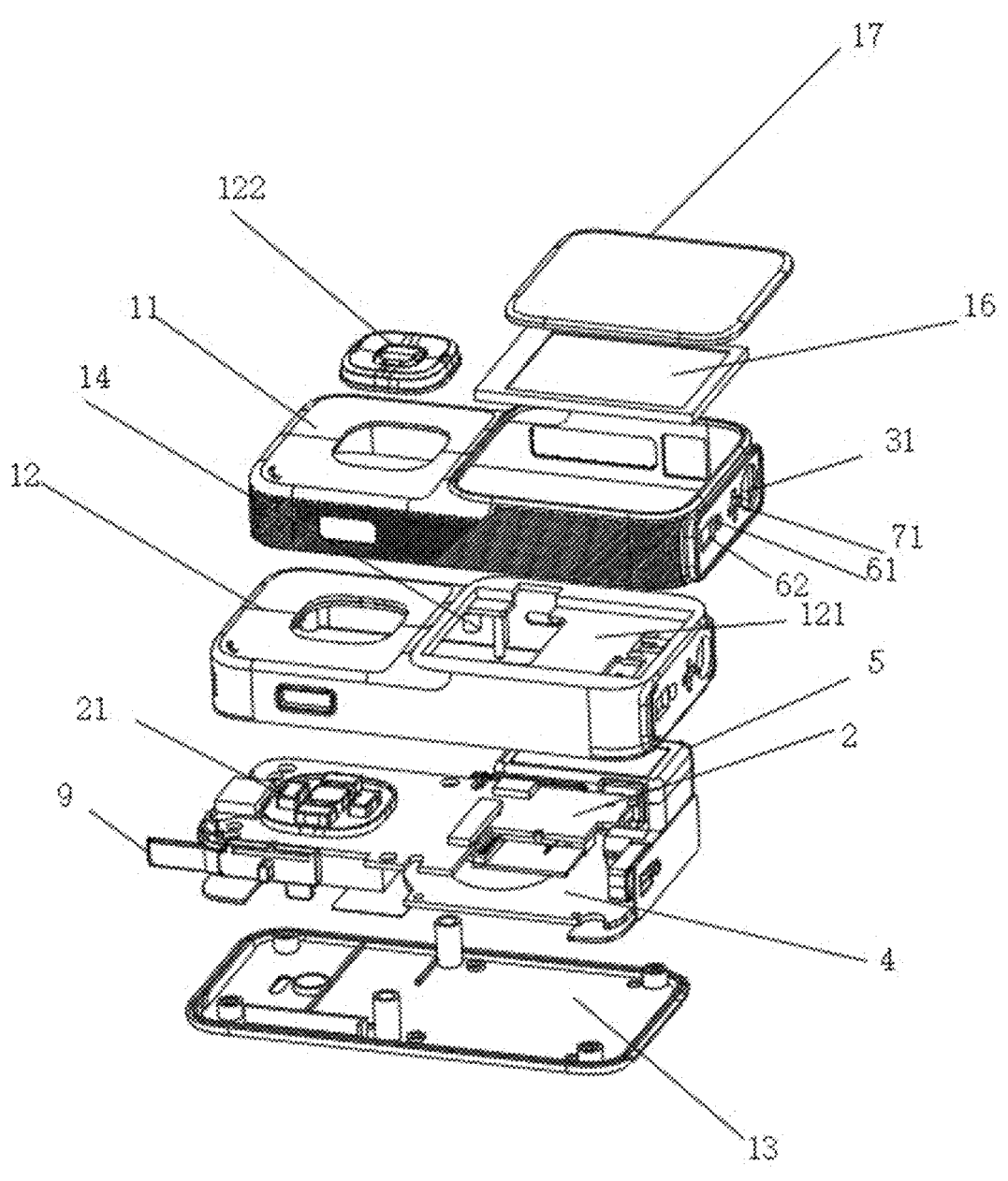
FIG. 1 is an explosive view of a multi-functional measuring instrument according to an embodiment of the present disclosure.

Reference numerals and denotations thereof:

1—Housing
2—Control circuit board
3—Illumination device
4—Wall detection circuit
5—Thermal imaging device
6—Laser ranging device
7—Laser projection device
8 Humidity measuring device
9—Electroprobe
11—Upper housing
12—Middle frame
13—Lower housing
14—Connection support
15—Hidden slot
16—Display screen
17—Outer screen
18—Nut
19—Spring groove
21—Control button
31—Illumination channel
51—Thermal imaging camera
52—Visible light camera
61—Transmit channel
62—Receive channel
71—Marking channel
72—Fixing base
81—Press switch
82—Telescopic copper needle
83—Slide block
84—Spring
85—Press portion
86—Clamp block
87—Clamping slot
91—Toggle switch
92—Alarm light
121—Display screen mount
122—Key portion

DETAILED DESCRIPTION

The technical solutions according to the embodiments of the present disclosure are described clearly and completely with reference to the accompanying drawings illustrating the embodiments. Obviously, the embodiments described are only some exemplary ones, rather than all embodiments of the present disclosure. Based on the embodiments of the present disclosure, all other embodiments obtained by those ordinary skilled in the art without creative efforts should fall within the scope of protection of the present disclosure.

Figure 2:
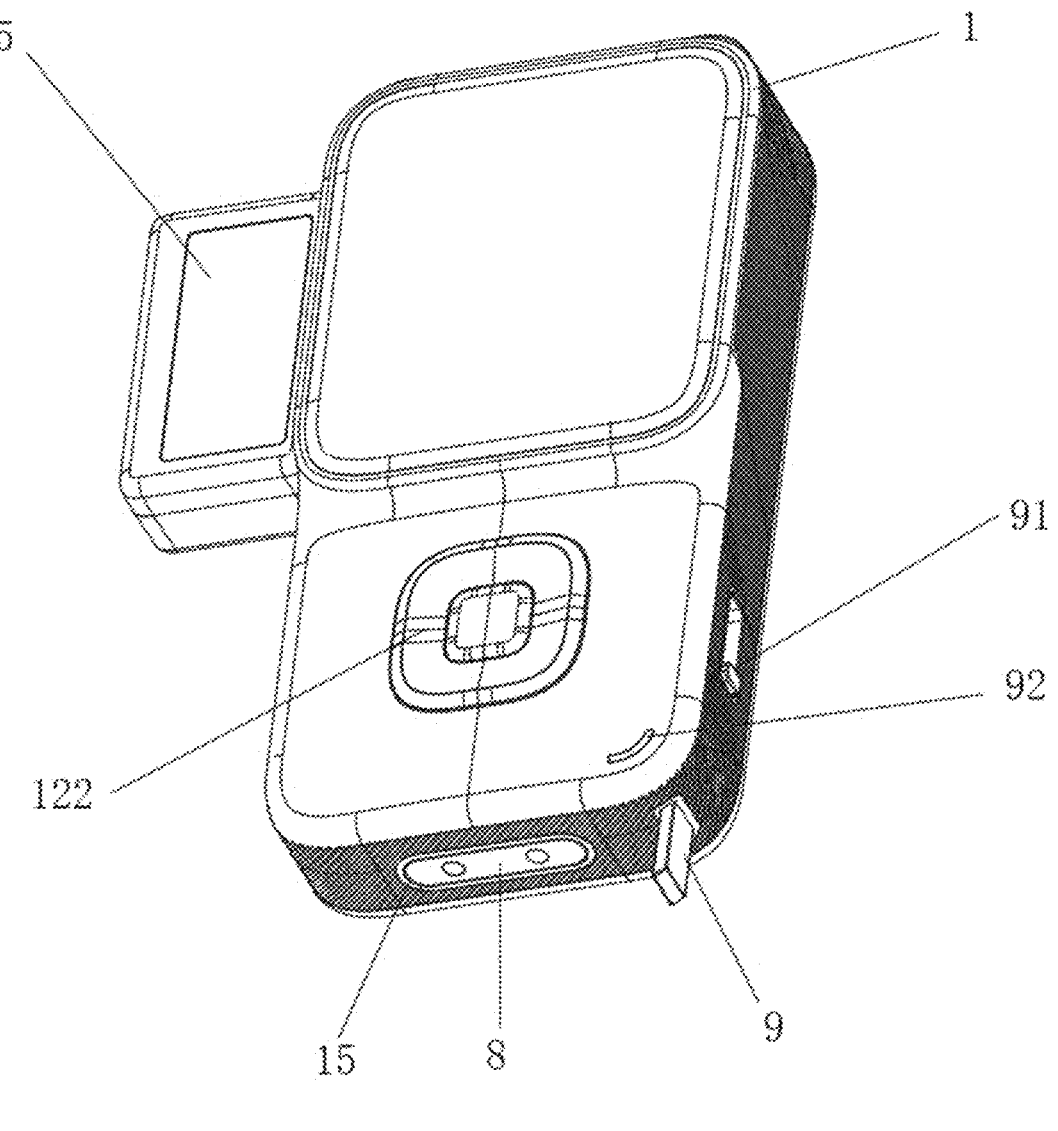
FIG. 2 is a perspective view of a multi-functional measuring instrument according to an embodiment of the present disclosure.
Figure 3:
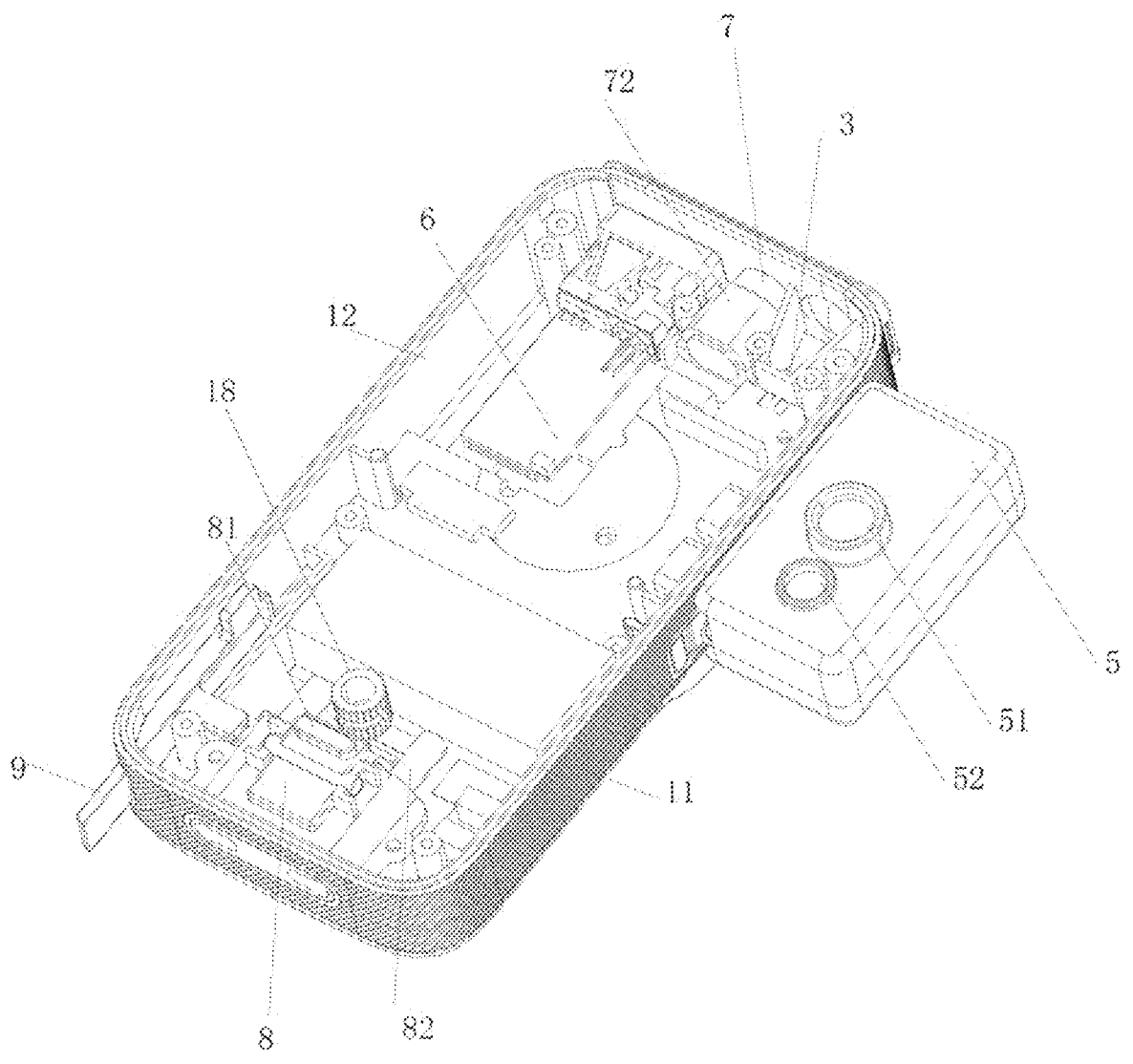
FIG. 3 is an internal structural diagram of a multi-functional measuring instrument according to an embodiment of the present disclosure.
Figure 4:
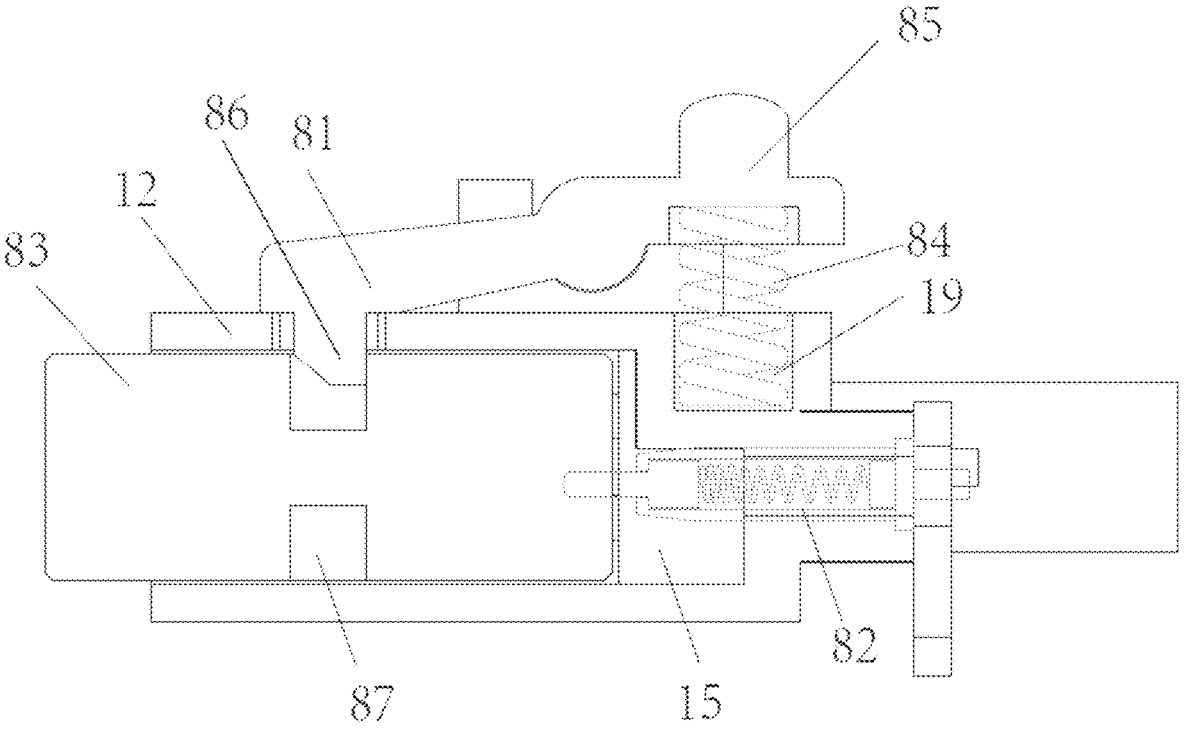
FIG. 4 is a sectional view of a humidity measuring device according to an embodiment of the present disclosure.

Referring to FIGS. 1 to 4, an embodiment provides a multi-functional measuring instrument. The instrument includes a housing 1, and a control circuit board 2 and a wall detection circuit 4 mounted inside the housing 1. An illumination device 3, a thermal imaging device 5, a laser ranging device 6, a laser projection device 7, a humidity measuring device 8, and an electroprobe 9 are mounted inside the housing 1. The illumination device 3, the wall detection circuit 4, the thermal imaging device 5, the laser ranging device 6, the laser projection device 7, the humidity measuring device 8, and the electroprobe 9 are electrically connected to the control circuit board 2 separately.

In this embodiment, before operations on a wall, the wall detection circuit 4 is capable of detecting foreign matters such as metal, non-metal, and woods that are invisible to naked eyes to determine positions of the foreign matters in the wall, such that structures of circuits, sheet materials, steel bars, and other components inside the wall are prevented from damages. In this way, the components inside the wall are protected, and unnecessary operations on the wall and damages to the wall caused by these operations, which increase workload and affect the beauty of the wall, are avoided.

In this embodiment, the housing 1 includes an upper housing 11, a middle frame 12, and a lower housing 13. The upper housing 11 and the middle frame 12 are integrally formed, the middle frame 12 is connected to the lower housing 13 via a connection support 14, and the control circuit board 2 is arranged between the middle frame 12 and the lower housing 13. A thermal imaging device 5 is arranged on one side of the housing 1. A thermal imaging camera 51 and a visible light camera 52 are arranged on the thermal imaging device 5. In this way, a thermal source can be captured clearly and fast by the thermal imaging camera 51 and the visible light camera 52.

The humidity measuring device 8 includes a press switch 81, a telescopic copper needle 82, a slide block 83, and a spring 84. The press switch 81 takes the middle frame 12 as a fulcrum to form a lever-supporting structure. An upper portion of the lever-supporting structure runs through the upper housing 11 to form a press portion 85, and a lower portion of the lever-supporting structure runs through the middle frame 12. A spring groove 19 is arranged on the middle frame 12 below the press portion 85. A lower end of the spring 84 is arranged inside the spring groove 19, and an upper end of the spring 84 is in contact with the press portion 85. A clamp block 86 is arranged at lower portion of the press switch 81. The slide block 83 is arranged inside the hidden slot 15 arranged at a bottom end portion of the housing 1, and clamping slots 87 cooperating with the clamp block 86 are arranged on upper and lower sides of the slide block 83. End portions of the two telescopic copper needles 82 are secured to the slide block 83, and a telescopic segment of the telescopic copper needle 82 is outside the slide block 83. For use the humidity measurement function, the press portion 85 of the press switch 81 is pressed, such that the spring 84 is compressed, and the clamp block 86 moves out of the clamping slot 87. The slide block 83 is bounced from the hidden slot 15 by an elastic force of the telescopic cooper needle 82. The other end of the slide block 83 is inserted into the hidden slot 15, and is secured by the clamp block 86 and the clamping slot 87. At this time, the telescopic cooper needle 82 protrudes outside the hidden slot 15 such that humidity is measured by the telescopic cooper needle 82. Meanwhile, a rear end of the telescopic cooper needle 82 is connected to the control circuit board 2 via the circuit inside the housing 1 to obtain measurement data.

A display screen mount 121 is arranged on the middle frame 12. A display screen 16 is mounted in the display screen mount 121. An outer screen 17 for protecting the display screen 16 is mounted on an outer side of the display screen 16. The display screen 16 is electrically connected to the control circuit board 2. A control button 21 is arranged on the control circuit board 2. A key portion 122 cooperating with the control button 21 is mounted above the display screen mount 121. The key portion 122 is used, in combination with the display screen 16, for controlling operations of the wall detection circuit 4, the thermal imaging device 5, the laser ranging device 6, and the laser projection device 7 separately. Measurement results are displayed in the display screen 16.

In some embodiments of the present disclosure, the laser ranging device 6 employs a distance measurement instrument disclosed in the Chinese patent CN104597437A. A transmit channel 61 and a receive channel 62 that allow passage of light from and to a light source of the laser ranging device 6 are arranged on the housing 1. The light source of the laser measuring device 6 is capable of transmitting light externally via the transmit channel 61. The transmitted light is reflected back upon striking a measurement object, and then is received via the receive channel 62. In this process, a round-trip time of the laser is recorded, so as to measure a distance from one end to the other end or an object size.

In some embodiments of the present disclosure, the laser projection device 7 adopts a cross-line laser head. A cross-shaped marking channel 71 is correspondingly arranged on an upper portion of the housing 1. The laser projection device 7 is secured inside the middle frame 12 via a fixing base 72. The laser projection device 7 emits two laser rays perpendicular to each other, and a horizontal marking is produced after the laser rays are projected on an object. One of the two laser rays is for horizontal marking, and the other laser ray perpendicular thereto is for vertical marking. Therefore, it is convenient for construction personnel to correct horizontal and vertical straightness when cutting sheet materials, and performing wall markings and other operations that require straightness. Moreover, the cross-shaped marking channel 71 is arranged at a front portion of the upper housing 11 opposite to the laser projection device 7. The cross-shaped marking channel 71 is shaped as a cross structure matching with the laser rays emitted by the cross-line laser head. The laser rays from the cross-line laser head are capable of passing through the cross-shaped marking channel 71, and also blocking interference laser rays from non-crossed lines, thus improving the accuracy of laser projection lines. In some other embodiments, for operations that do not impose stricter requirements on marking, the laser projection device 7 may also adopt a straight-line laser head, that is, only one horizontal or vertical laser is emitted, which has the same function as above mentioned.

In some embodiments of the present disclosure, a switch for turning on or off the illumination device is arranged on one side of the housing 1, and an illumination channel 31 is correspondingly arranged at a top of the housing 1, such that the measuring instrument can be used in dark or insufficiently bright environments.

In the embodiments, the transmit channel 61, the receive channel 62, the marking channel 71, and the illumination channel 31 are arranged on the same side of the housing 1. Therefore, in an actual construction process, with an individual or combination of the distance measuring function, the object detection function, the marking function, and the illumination function according to the present disclosure, for the construction personnel, the working efficiency is improved, the construction personnel do not need to carry on a plurality of measuring tools, the problem that the construction personnel have to change various detection tools continuously to detect various different parameters is solved. Therefore, the instrument has strong practicability.

In some embodiments of the present disclosure, the electroprobe 9 is arranged on a side of the housing 1 on one side of the humidity measuring device 8, the electroprobe 9 is hidden inside the housing 1 via a toggle switch 91, and the electroprobe 9 is also electrically connected to an alarm light 92. A nut is secured to the lower housing 13. The nut 18 is embedded inside the lower housing 13, and the lower housing 13 is connected to the outside via the nut 18 and may be mounted on a tripod for use.

In some embodiments of the present disclosure, the control circuit board 2 may adopt a double-sided circuit board with model of SX00013 developed by Shenzhen Shenxiang Circuit Board Co., Ltd., and the laser projection device 7 may adopt an LDB163L mark projector developed by Beijing Aozhiqiang Electronics Technology Co., Ltd.

For those skilled in the art, the present disclosure is not limited to details of the above exemplary embodiments, the present disclosure may be realized in other specific forms without departing from the spirit or scope of the present disclosure. Therefore, the embodiments of the present disclosure are not limitative. The scope of the present disclosure is defined by the appended claims. It is intended that all variations falling within the meaning and scope of equivalent elements of the claims shall be included in the present disclosure. Any marks or reference numerals of the accompanying drawings in the claims shall not be deemed as limiting the related claims.

The invention claimed is:

1. A multi-functional measuring device, comprising:
a housing; and
a control circuit board and a wall detection circuit mounted inside the housing;
wherein a slot is arranged at a bottom end portion of the housing,
a humidity measuring device is mounted inside the slot, and
a thermal imaging device is mounted on one side of the housing, wherein the thermal imaging device is provided with a thermal imaging camera and a visible light camera, and the wall detection circuit, the humidity measuring device and the thermal imaging device are electrically connected to the control circuit board separately.

2. The multi-functional measuring device according to claim 1, wherein the housing comprises an upper housing, a middle frame, and a lower housing;
wherein the middle frame is connected to the lower housing via a connection support, and the control circuit board is arranged between the middle frame and the lower housing.

3. The multi-functional measuring device according to claim 2, wherein a nut is secured to the lower housing.

4. The multi-functional measuring device according to claim 2, wherein a laser ranging device and a laser projection device are mounted at an inner top of the middle frame;
wherein the laser ranging device and the laser projection device are electrically connected to the control circuit board, separately;
the laser projection device adopts a cross-line laser head, a cross-shaped marking channel is correspondingly arranged on the housing, and the laser projection device is secured inside the middle frame via a securing base; and
a transmit channel and a receive channel that allow passage of light from and to a light source of the laser ranging device are arranged on the housing.

5. The multi-functional measuring device according to claim 4, wherein an illumination device is further mounted on the laser ranging device;
wherein the illumination device is eclectically connected to the control circuit board, a switch for turning on or off the illumination device is arranged on a side of the housing, and an illumination channel is corresponding arranged on the housing.

6. The multi-functional measuring device according to claim 2, wherein the humidity measuring device comprises a press switch, two telescopic copper needles, a slide block, and a spring;

wherein the press switch takes the middle frame as a fulcrum to form a lever-supporting structure, an upper portion of the lever-supporting structure runs through the upper housing to form a press portion, a lower portion of the lever-supporting structure runs through the middle frame, a spring groove is arranged in the middle frame below the press portion, a lower end of the spring is arranged inside the spring groove, and an upper end of the spring is in contact with the press portion; and a clamp block is arranged at a lower portion of the press switch, clamping slots and the clamp block are arranged on upper and lower sides of the slide block, and end portions of the two telescopic copper needles are secured to the slide block.

7. The multi-functional measuring device according to claim 2, wherein a display screen mount is arranged at an upper portion of the middle frame;

wherein a display screen is mounted in the display screen mount, an outer screen is mounted on an outer side of the display screen, and the display screen is electrically connected to the control circuit board.

8. The multi-functional measuring device according to claim 7, wherein a control button is arranged on the control circuit board, and a key portion is mounted on the middle frame.

9. The multi-functional measuring device according to claim 1, wherein an electroprobe is further mounted on the humidity measuring device;

wherein the electroprobe is electrically connected to the control circuit board, the electroprobe is configured to be provided inside the housing, and the electroprobe is further electrically connected to an alarm light.

\* \* \* \* \*